United States Patent [19]
Richardson

[11] Patent Number: 4,619,386
[45] Date of Patent: Oct. 28, 1986

[54] VEHICLE DESK CONTAINER

[76] Inventor: Jennings R. Richardson, 49 S. Cholla, Gilbert, Ariz. 85234

[21] Appl. No.: 608,399

[22] Filed: May 9, 1984

[51] Int. Cl.$^4$ ............................................... B60R 7/00
[52] U.S. Cl. ................................ 224/277; 224/42.42; 224/42.43; 108/44
[58] Field of Search ............... 224/277, 273, 275, 276, 224/42.42, 42.43, 42.44, 42.45 R, 42.46 R; 108/44, 45; 220/18

[56] References Cited

U.S. PATENT DOCUMENTS

| | | | |
|---|---|---|---|
| D. 199,993 | 1/1965 | Cohen | 108/44 |
| 2,898,170 | 8/1959 | Antonius | 108/45 |
| 3,051,539 | 8/1962 | Montgomery | 108/44 |
| 3,104,895 | 9/1963 | Feuerbach et al. | 108/45 |
| 3,750,597 | 8/1973 | Muns | 108/45 |
| 3,922,973 | 12/1975 | Sturgeon | 108/44 |
| 3,951,486 | 4/1976 | Tracy | 220/18 |
| 3,983,976 | 10/1976 | Taylor | 220/18 |

Primary Examiner—Stephen Marcus
Assistant Examiner—David Voorhees
Attorney, Agent, or Firm—Harry M. Weiss & Associates

[57] ABSTRACT

A generally rectangular-shaped vehicle desk container is disclosed which has a top lid coupled to the container by hinges. The container has a built-in counter, light, clock and pencil sharpener. A calculator and drawer slidably engage the front end of the container. A number of partitions may be placed inside the container in order to provide individual compartments. Tubular-shaped holders and side compartments are attached to the side of the container. The lid has a spring clip for holding documents and an aperture through it for holding cups or glasses. Various information may be written on the bottom side of the lid if desired. The lid incorporates a smaller lid which may be located directly over the drawer. A plurality of straps can be used to removably secure the container to a car seat or support. The container can be removably secured to a vehicle dashboard if desired. This is accomplished by a base which is pivotably coupled to the desk container. Support arms, a support strut and blocks are used in conjunction with the base to secure the container to the dashboard.

7 Claims, 10 Drawing Figures

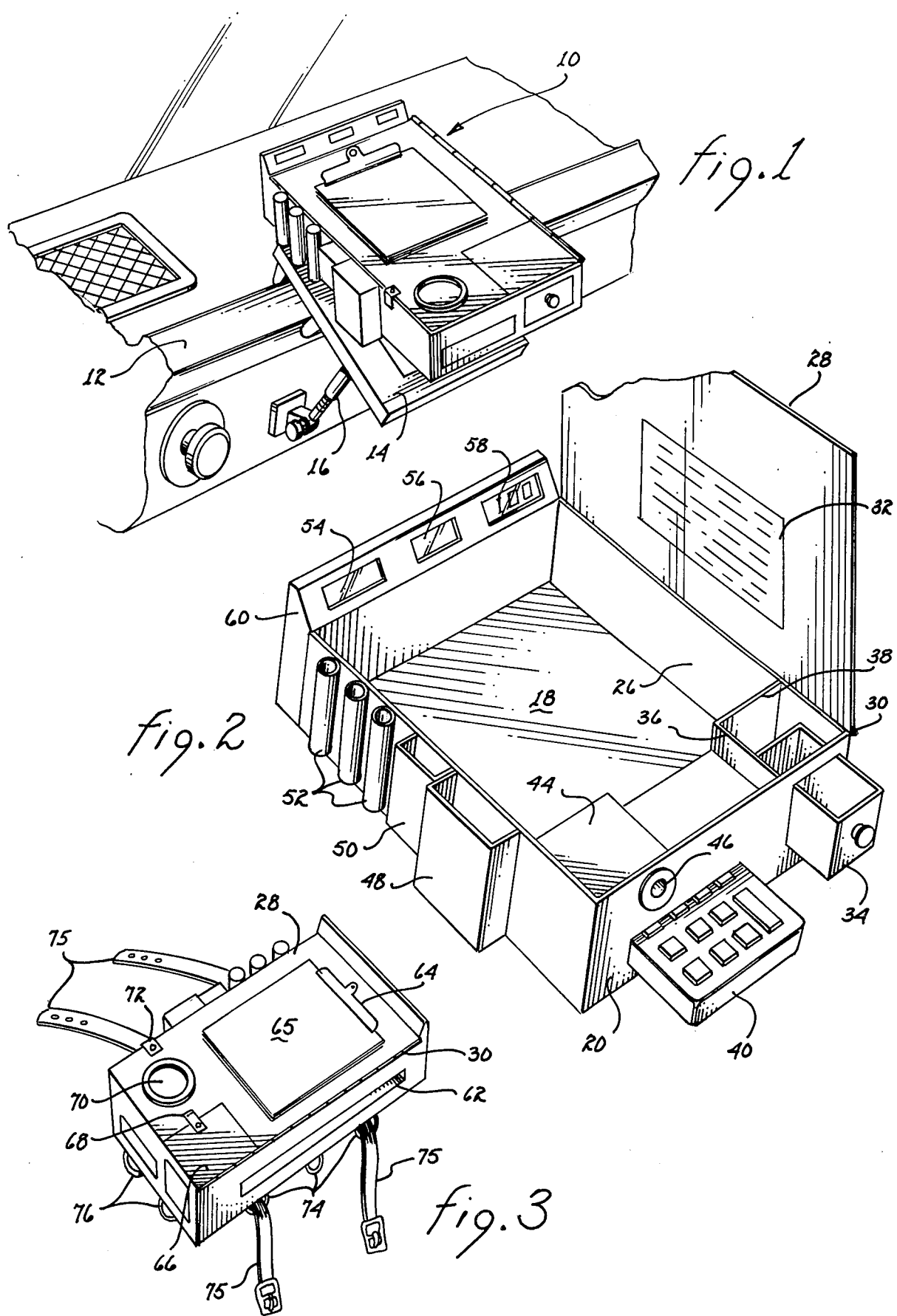

VEHICLE DESK CONTAINER

BACKGROUND OF THE INVENTION

This invention relates generally to containers which can be used to hold objects in a vehicle and, more particularly, to a desk container which can be mounted on a vehicle dashboard and used as a desk and for holding a variety of objects.

Very often, the driver of an automobile or truck needs to store objects such as cigarettes, pencils, papers, calculators, cups, etc. Unless there is some readily available place where these objects can be kept, they tend to slide or fall about when a vehicle is brought to a sudden stop. This can lead to extreme problems, when a cup containing liquid spills its contents inside the vehicle. In addition, there is often a need for a flat surface upon which a paper or document can be securely held in place. This would allow a passenger to write on the document while the vehicle is moving and the driver to do the same after the vehicle is stopped.

Accordingly, there is a need for a multipurpose desk container which can be secured to a vehicle dashboard or strapped to a car seat or other part of the vehicle. The desk container should be able to hold a variety of objects and would have such features as a light, clock, counter, pencil sharpener, calculator, drawer, or other useful built-in devices. A need exists for a container which would supply sufficient storage space to hold needed objects and would have one or more lids that could be snapped shut.

SUMMARY OF THE INVENTION

It is an object of this invention to provide an improved vehicle desk container.

It is another object of this invention to provide an improved vehicle desk container which can be used to hold a variety of useful objects. As such, sufficient storage space should be provided for such objects and one or more lids should be provided which will secure the objects within the container.

It is a further object of this invention to provide an improved vehicle desk container with built-in features such as a light, clock, counter, pencil sharpener, calculator, drawer, etc.

It is still a further object of this invention to provide an improved vehicle desk container which can be secured to a vehicle dashboard or strapped to a car seat or other part of the vehicle.

In accordance with one embodiment of this invention, a vehicle desk container for use in a vehicle is disclosed which comprises body means for holding a variety of objects and devices; lid means pivotably coupled to the body means for opening and closing the top portion of the body means; built-in compartment means operably coupled to the body means for providing a variety of useful functions, the built-in compartment means having at least one of an electric functional unit, an electronic functional unit or a mechanical unit; and securing means for removably securing the body means to at least a seat or a support in the vehicle. In this embodiment, a generally rectangular-shaped container is disclosed which has a top lid coupled to the container by hinges. The container has a built-in counter, light, clock and pencil sharpener. A calculator and drawer slidably engage the front end of the container. A number of partitions may be placed inside the container in order to provide individual compartments. Tubular-shaped holders and side compartments are attached to the side of the container. The lid has a spring clip for holding documents and an aperture through it for holding cups or glasses. Various information may be written on the bottom side of the lid if desired. The lid may incorporate a smaller lid which may be located directly over the drawer. Finally, a plurality of straps can be used to removably secure the container to a car seat or support.

In accordance with another embodiment of this invention, a base is pivotably coupled to the desk container for the purpose of removably securing the container to a vehicle dashboard. In this embodiment, support arms, a support strut and blocks are used with the base to secure the container to the dashboard. The blocks are used to removably secure the base to a vehicle dashboard. Support arms pivotable coupled to the base add additional support.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a perspective view showing the desk container mounted on a vehicle dashboard;

FIG. 2 is a top perspective view of the desk container with the upper lid opened;

FIG. 3 is a top perspective view of the desk container with the upper lid closed showing how straps may be attached to the container;

DESCRIPTION OF THE PREFERRED EMBODIMENT

Figure 4:
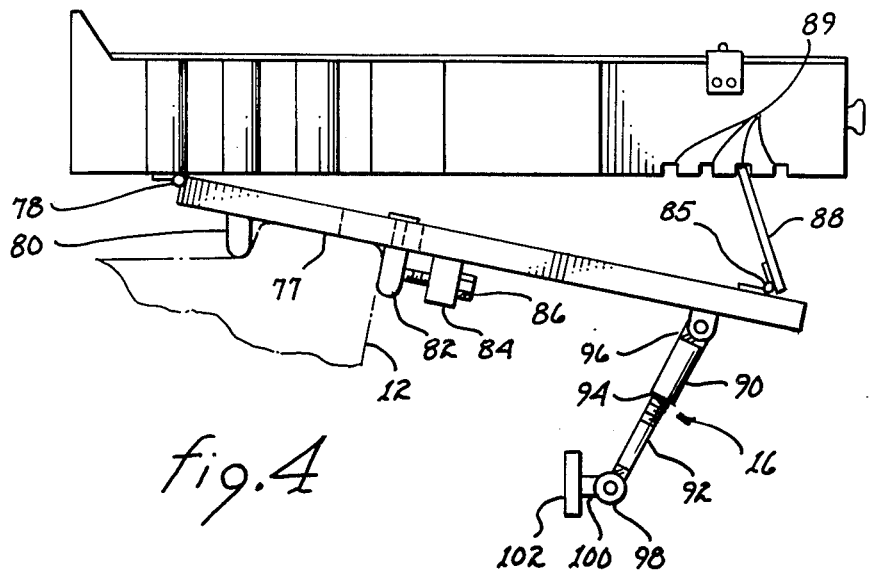
FIG. 4 is a side view of the desk container showing how the base is used with blocks and support arms to secure the container to a vehicle dashboard.

FIG. 1 shows a perspective view of a vehicle desk container, generally designated by reference number 10, mounted on a vehicle dashboard 12. The desk container 10 is mounted on the dashboard 12 by a base 14 and support arms 16.

FIG. 2 is a top perspective view of one embodiment of the desk container 10. This embodiment consists of a box-shaped container 10 having a bottom 18, front end 20, rear end 22, left side 24, and right side 26. An upper lid 28 is coupled to the right side 26 by hinges 30. The underside of the lid 28 can be used for displaying certain information 32 such as a calendar, name, address, telephone numbers, or the like. A drawer 34 is shown slidably engaging the desk container 10. Partitions 36 and 38 form a compartment inside the container 10 which encloses the drawer 34. It is important to note that the container 10 may be fabricated with a number of other compartments (not shown) which may be used to hold various objects or other built-in devices. Objects such as paper clips, erasers, and the like may be kept in the drawer 34. In an alternative embodiment, the partitions 36 and 38 may be used to contain objects without a drawer 34. In such a case, the front end 20 would not have an opening for the drawer 34. A calculator 40 is shown slidably engaging the desk container 10. Drawer 34 may be kept shut by a latch or other locking devices (not shown) if desired. A built-in pencil sharpener 44 is contained within the desk container 10 as shown in FIG. 2. An aperture 46 through the front end 20 allows a pencil to be inserted into the pencil sharpener 44.

The desk container 10 shown in FIG. 2 has other useful features. Mounted on the left side 24 of the desk container 10 are side compartments 48 and 50 for holding items such as cigarettes, a cigarette lighter, or the like. Only two side compartments 48 and 50 are shown in FIG. 2. However, any number of side compartments can be mounted on either side 24 or 26 of the desk container 10. Tubular-shaped holders 52 for holding items such as pens, pencils, or the like are shown attached to the container 10. The holders 52 may be attached at the front or rear of either side 24 or 26 of the container 10. Special built-in features such as a counter 54, light 56, clock 58, or the like may be built-into the top rear end 22 of the container 10 as shown in FIG. 2. Preferably, these features are built-into a wedge-shaped portion 60 of the rear end 22 in order to allow the faces of the counter 54, light 56 and clock 58 to be read easily from the front of the container 10.

Referring to FIG. 3, the desk container 10 is shown with the lid 28 shut. Note that the lid 28 is attached to the container 10 by hinges 30 which allow it to be opened and shut. The lid 28 is preferably snapped shut by latch 72. A smaller lid 66 is also attached to the container 10 by hinges 30 and is preferably snapped shut by latch 68. It is important to note that the desk container 10 may be fabricated without a smaller lid 66 if desired. Lid 66 is preferably positioned over drawer 34 (when shut) which would allow objects to be taken out of the drawer 34 without sliding it open. As such, the drawer 34 may be locked or latched shut in order to prevent it from sliding open while the vehicle is moving. The lid 28 preferably has an aperture 70 through it which may serve as a cup or glass holder. An elongated slot 62 may be cut through either side 24 or 26 of the container. Such a slot would allow papers to be placed inside the container 10 without opening the lid 28. The container has a clip 64 attached to lid 28 which would allow papers 65 to be clipped to the top of the lid 28. As a result, the top of lid 28 would provide a flat surface upon which the papers 65 would be securely held to the top of the lid 28. A passenger could write on the papers 65 while the vehicle is moving.

The desk container 10 preferably has a plurality of rings 76 attached to the bottom of its front and rear ends 20 and 22 as shown in FIG. 3. Straps (not shown) may be attached to these rings 76 allowing the container 10 to be securely strapped to a car seat. In a similar manner, the container 10 may have a plurality of rings 74 attached to the bottom of its sides 24 and 26. Likewise, straps 75 may be attached to the rings 74 in order to secure the container 10 to some part of the vehicle such as an arm rest or a divider separating two seats. The straps 75 shown in FIG. 3 show standard buckles for connecting the straps 75 together. However, quick at-tach-detach surfaces may be used instead of buckles to connect the straps 75.

FIG. 4 is a side view of the desk container 10 showing how the container 10 may be mounted on the vehicle dashboard 12 by the base 14 and support arms 16. The base 14 is rotatably coupled to the container 10 by hinges or inserts 78 and is preferably detachable or removable from the container 10 in order to allow the container to be strapped to a seat or other support if desired.

One embodiment for mounting the base 14 to a vehicle dashboard 12 is illustrated in FIG. 4. The actual embodiment needed would, of course, depend on the configuration of the dashboard 12. Preferably, a fixed block 80 is secured to the bottom of the base 14 and an adjustable block 82 is slidably engaged to the bottom of the base 14. With the dashboard configuration 12 and the preferred embodiment shown in FIG. 4, the base 14 is first placed on top of the dashboard 12. The fixed block 80 prevents the base 14 from slipping off the dashboard 12. After the base 14 has been positioned, the adjustable block 82 is slid up against the dashboard 12. A positioning block 84 and bolts or screws 86 are then used to hold the adjustable block 82 against the dashboard. The positioning block 84 is preferably secured to the base 14 by removable clamps, brackets, bolts or screws (not shown) which may be removed in order to allow the block 84 to be moved to another position. The positioning block 84 has a plurality of threaded apertures (not shown) for engaging the bolts or screws 86.

Referring again to FIG. 4, a support strut 88 is rotatably coupled to the base 14 by hinges 85. The free end of the support strut 8 is used to engage any one of a plurality of elongated grooves 89 in the bottom of the container 10. Additional support is furnished by preferably two support arms 16. The support arms 16 are pivotably coupled to the base 14 by pivot joints 96 and consist of upper members 90 and lower members 92. Preferably, the pivot joints 96 may be tightened by a screw or bolt (not shown) in order to prevent rotation of the joints after tightening. The lower members 92 are threaded into upper members 90 at 94 allowing the length of the support arms 16 to be adjusted if desired. The lower members 92 are pivotably coupled to attachment members 100 at pivot joints 98. Similar to pivot joints 96, the pivot joints 98 may be tightened by a screw or bolt (see FIG. 8) if desired. Attachment members 100 are fastened to attachment plates 102 which may be secured to any part of the vehicle in order to provide additional support for the desk container 10.

It is important to note that the base 14 may be used without blocks 80, 82 and 84. This may be accomplished by the use of quick attach-detach surfaces which can be applied to the bottom of the base 14 and the top of the dashboard 12 at position 77. In addition, quick attach-detach surfaces can also be used for the purpose of engaging the support strut 88 with the container 10. Quick attach-detach surfaces would be attached to the top end of the strut 88 and to the bottom of the container 10. In such a case, grooves 89 would be eliminated.

Figure 5:
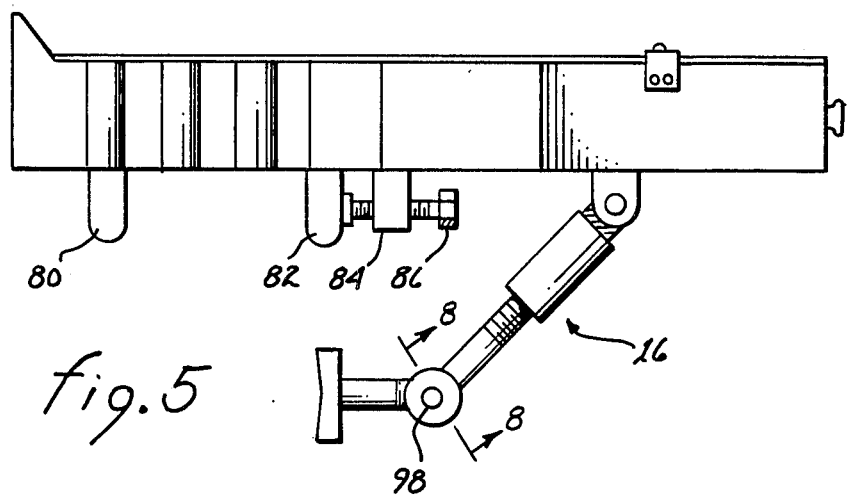
FIG. 5 is a side view of another embodiment of the desk container with the support arms and blocks connected directly to the container.

FIG. 5 shows another embodiment of the desk container 10 with the blocks 80, 82 and 84 as well as the support arms 16 directly attached or coupled to the bottom of the container 10. The same method of attaching or coupling the blocks 80, 82 and 84 and support arms 16 to the base 14 may be used to attach or couple the same to desk container 10. As a result, this embodiment may be mounted to the dashboard 12 without the use of the base 14.

Figures 6, 7, 8:
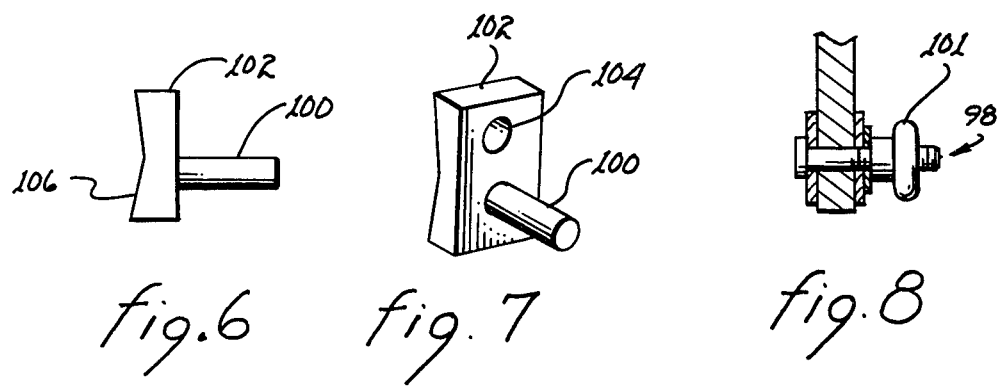
FIG. 6 is a side view of the attaching plate.
FIG. 7 is an enlarged perspective view of the attaching plate.
FIG. 8 is a cross-sectional view of the pivot joint of FIG. 5 along line 7—7.

Side and perspective views of an attachment plate 102 are shown in FIGS. 6 and 7. The attachment plate 102 has an aperture 104 through it for a bolt or screw that may be used to fasten the plate 102 to a support. Alternatively, a surface 106 such as an adhesive surface, a quick attach-detach surface, or a magnetic surface may be used to fasten the plate 102 to some support in the vehicle. In addition, the surface 106 can be used in conjunction with a bolt or screw to attach the plate 102 to a support.

FIG. 8 illustrates an enlarged cross-sectional view of the pivot joint 98 taken along line 7—7 shown in FIG. 5. Note that the joint may be tightened by nut 101 if desired.

Figure 9:
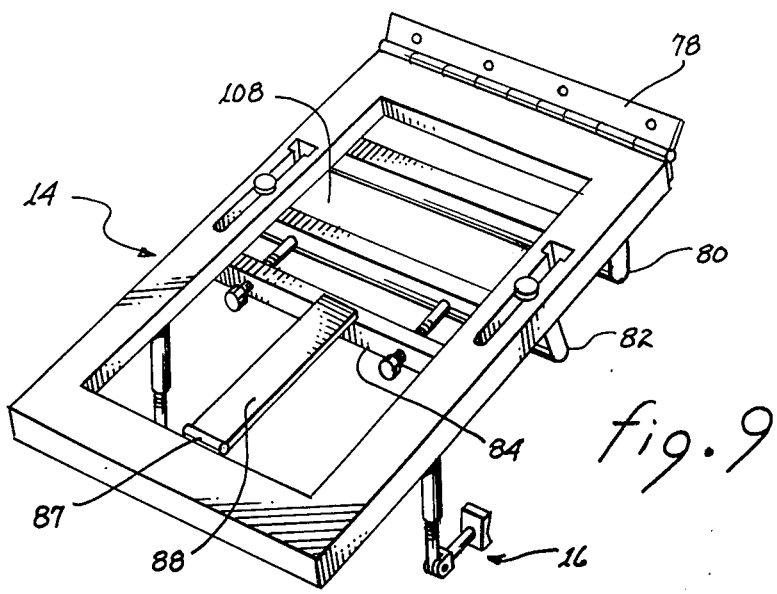
FIG. 9 is a top perspective view of the base.

Referring to FIG. 9, a top perspective view of the base 14 is shown. Note that the support strut 88 is shown coupled to the base 14 by hinges 87. However, any other type of pivotable joint may be used in place of the hinges 87. Hinges 78 are shown at one end of the base 14. Inserts which allow the base 14 to be removed from the container 10 may be used in place of the hinges 78 if desired. The base 14 has a rectangular-shaped aperture through it. This feature allows a passenger or driver to look through the base 14 in order to see some instrument, knob, handle, switch, dial, etc.

Figure 10:
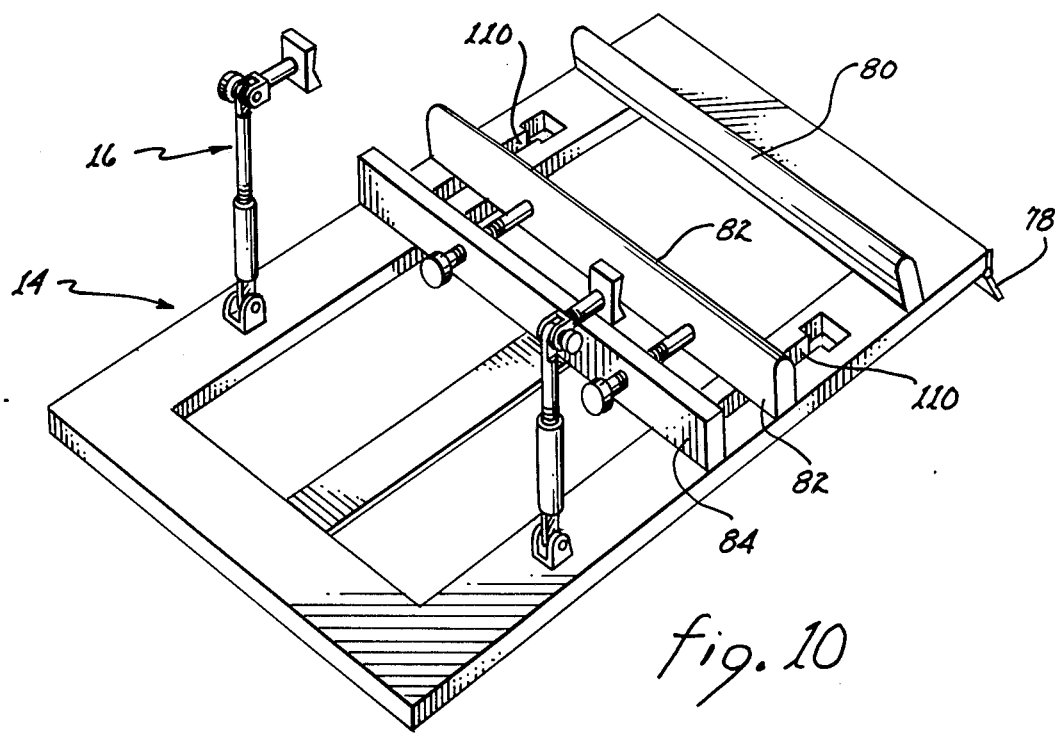
FIG. 10 is a bottom perspective view of the base showing how the support arms and blocks are coupled to the base.

FIG. 10 shows a bottom perspective view of the base 14. Slide grooves 110 are provided on the bottom on the base 14 in order to allow the adjustable block 82 to slidably engage the base 14.

While the invention has been particularly shown and described in reference to preferred embodiments thereof, it will be understood by those skilled in the art that various modifications and changes in the form and details may be made therein without departing from the spirit and scope of the invention.

I claim:

1. A vehicle desk container for use in a vehicle, comprising:

body means for holding a variety of objects and devices;

lid means pivotably coupled to said body mean for opening and closing the top portion of said body means;

built-in compartment means operably coupled to said body means for providing a variety of useful functions, said built-in compartment means having at least one of an electric functional unit, an electronic functional unit any a mechanical functional unit; and securing means for removably securing said body means to at least one of a seat and a support in said vehicle, said securing means comprises a plurality of straps operably coupled to said body means, each of said calculator, pencil sharpener, clock, light and counter is one of an electric unit, an electronic unit and a mechanical unit, said lid means is pivotably coupled to said body means by hinges, said lid means having a latch allowing said lid means to be snapped shut, said lid means having a spring clip attached to the top side of said lid means for holding papers and other documents, said lid means having an aperture through it for holding cups, glasses and other containers, said lid means having a smaller lid pivotably coupled to said body means by hinges, said smaller lid having a latch allowing said smaller lid to be snapped shut, said lid means having a surface on its bottom side allowing written and other information to be placed thereon, said body means being generally rectangular-shaped container having a bottom, a front end, a rear end and two sides, said body means having a wedge-shaped member attached to the top of said rear end, said wedge-shaped member having a counter, light and clock building into it, said built-in compartment means comprises a drawer which slidably engages said body means, a calculator which slidably engages said body means, a calculator operably coupled to said body means, and pencil sharpener operably coupled to said body means, said front end having apertures through it for engaging said drawer and said calculator and for inserting a pencil into said pencil sharpener, said securing means comprises a plurality of straps operably coupled to said body means, said body means having a plurality of partitions operably attached to the inside of said body means dividing the space inside said body means into a plurality of compartments, said lid means is pivotably coupled to said body means by hinges, said lid means having a latch allowing said lid means to be snapped shut, having a spring clip attached to the top side of said lid means for holding papers and other documents, having an aperture through said lid means for holding cups, glasses and other containers, having a surface on the bottom side of said lid means allowing written and other information to be placed thereon, and having a smaller lid pivotably coupled to said body means by hinges, said smaller lid having a latch allowing said smaller lid to be snapped shut, said base means comprises a flat rectangular-shaped base, said base being removably coupled to the bottom of said body means, support arm means pivotably coupled to said base for supporting said base, a support strut pivotably coupled to said base, and block means operably coupled to said base for removably securing said base to said vehicle dashboard, said body means having a plurality of elongated grooves in its bottom surface for operably engaging said support strut, said block means comprises a fixed block secured to the bottom of said base, an adjustable block slidably engaged to the bottom of said base and a positioning block removably coupled to the bottom of said base, said positioning block having a plurality of bolts engaging it and passing through it for holding said adjusting block against said vehicle dashboard.

2. The vehicle desk container of claim 1, wherein said support arm means comprises two support arms, each of said support arms including an upper member pivotably coupled to said base, a lower member threaded into said upper member, an attachment member pivotably coupled to said lower member, and an attachment plate fastened to said attachment member, said attachment plate having at least one of a bolt, an adhesive surface, a quick attach-detach surface and a magnetic surface for fastening said attachment plate to a support.

3. The vehicle desk container of claim 2, further comprising base means operably coupled to said body means for removably securing said body means to a vehicle dashboard, said base means comprising:

a flat rectangular-shaped base, said base being removably coupled to the bottom of said body means;

support arm means pivotably coupled to said base for supporting said base;

a support strut pivotably coupled to said base; and
block means operably coupled to said base for removably securing said base to said vehicle dashboard.

4. The vehicle desk container of claim 3, wherein said body means having a plurality of elongated grooves in its bottom surface for operably engaging said support strut.

5. The vehicle desk container of claim 4, wherein said block means comprises a fixed block secured to the bottom of said base, an adjustable block slidably engaged to the bottom of said base and a positioning block removably coupled to the bottom of said base, said positioning block having a plurality of bolts engaging it and passing through it for holding said adjusting block against said vehicle dashboard.

6. The vehicle desk container of claim 5, wherein said support arm means comprises two support arms, each of said support arms including an upper member pivotably coupled to said base, a lower member threaded into said upper member, an attachment member pivotably coupled to said lower member, and an attachment plate fastened to said attachment member, said attachment plate having at least one of a bolt, an adhesive surface, a quick attach-detach surface and a magnetic surface for fastening said attachment plate to a support.

7. The vehicle desk container of claim 6, further comprising support arms pivotably coupled to the bottom of said body means and block means operably coupled to the bottom of said body means for removably securing said body means to said vehicle dashboard.

* * * * *